United States Patent [19]

Malesani

[11] Patent Number: 4,733,157

[45] Date of Patent: Mar. 22, 1988

[54] ELECTRONIC VOLTAGE REGULATOR WITH TWO-DIRECTIONAL ACTION FOR ALTERNATORS

[75] Inventor: Luigi Malesani, Padua, Italy

[73] Assignee: M.E.C.C. Alte S.p.a., Creazzo, Italy

[21] Appl. No.: 808,063

[22] Filed: Dec. 12, 1985

[30] Foreign Application Priority Data

Dec. 14, 1984 [IT] Italy ............................... 85669 A/84

[51] Int. Cl.⁴ ............................ H02P 9/10; H02P 9/30
[52] U.S. Cl. ......................................... 322/28; 322/63; 322/73
[58] Field of Search ....................... 322/46, 59, 63, 64, 322/28, 73

[56] References Cited

U.S. PATENT DOCUMENTS

| | | | |
|---|---|---|---|
| 3,506,909 | 4/1970 | Bohm et al. | 322/63 |
| 3,512,076 | 5/1970 | Larson et al. | 322/64 X |
| 3,521,148 | 7/1970 | Kirk et al. | 322/64 X |
| 3,713,016 | 1/1973 | Lehnhoff | 322/28 |
| 3,863,137 | 1/1925 | Mishima et al. | 322/64 X |
| 4,004,211 | 1/1977 | Takao | 322/63 |
| 4,383,215 | 5/1983 | Frister | 322/63 |

FOREIGN PATENT DOCUMENTS

| | | |
|---|---|---|
| 280437 | 4/1970 | Austria . |
| 1392698 | 2/1965 | France . |
| 1478297 | 6/1977 | United Kingdom . |

*Primary Examiner*—R. J. Hickey
*Attorney, Agent, or Firm*—Birch, Stewart, Kolasch & Birch

[57] ABSTRACT

A voltage regulator supplies excitation current both in addition and in subtraction, since supplied current can vary not only in intensity, but also in direction depending on the signal given by a control device, which regulates the conduction of the regulator both as far as intensity and direction are concerned, according to a comparison between a reference voltage and the voltage of the alternator itself, or, in any case, a part of it (123), said addition or subtraction been performed by electric or magnetic means. According to a preferred form of execution, the electronic device has bidirectional conditions consisting of a TRIAC (210) which feeds an auxiliary winding in one direction or the other; the TRIAC is triggered, in turn, by a control circuit which sends out a triggering signal being in relation to the voltage of the alternator and to a reference voltage.

The TRIAC can be replaced by two controlled diodes or by two transistors or similar means, being connected to each other in inverted parallel.

According to another form of execution, the circuit of the electronic regulator has two controlled diodes, transistors or similar means, which send current having the same direction to two separate windings being wound in opposite directions. Yet another form of execution uses four controlled diodes, transistors or similar means which conduct in crossed pairs and feed a single auxiliary winding.

6 Claims, 19 Drawing Figures

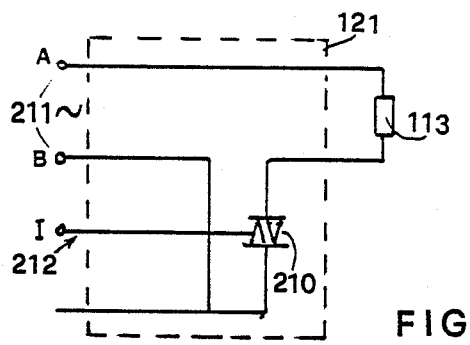
FIG. 3
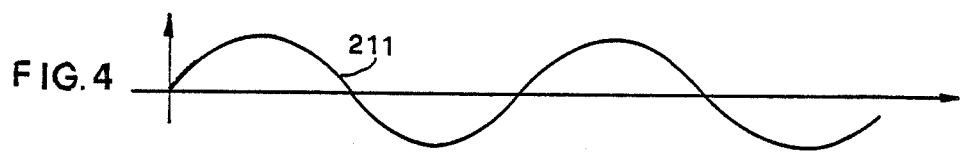
FIG. 4
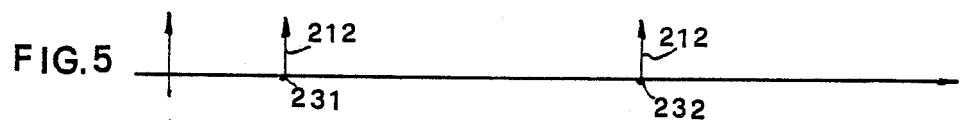
FIG. 5
FIG. 6
FIG. 7
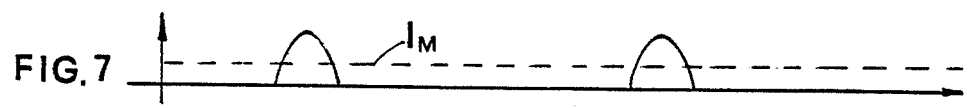
FIG. 8
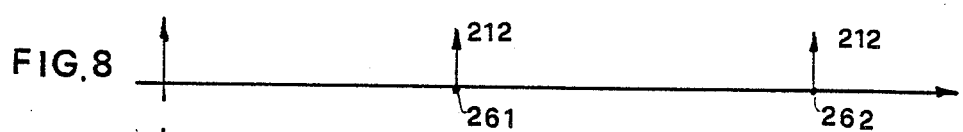
FIG. 9
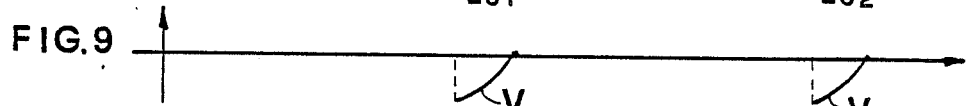
FIG. 10
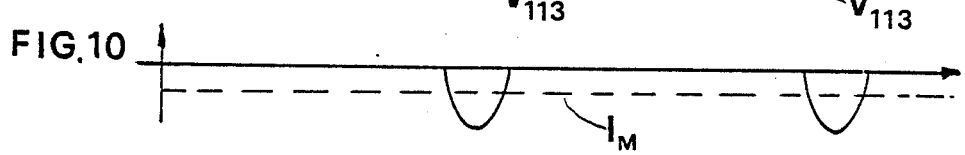

ELECTRONIC VOLTAGE REGULATOR WITH TWO-DIRECTIONAL ACTION FOR ALTERNATORS

BACKGROUND OF THE INVENTION

The invention concerns an electronic regulation system for alternator excitation, which is capable of being added by means of connectors, or other connecting means, to an alternator already provided with its own excitation system.

As it is well known, the excitation of alternators with or without brushes, is obtained through different systems, among which the following can be mentioned:
compound excitation
excitation by electronic voltage regulation
mixed excitation consisting of compound and electronic regulator.

Excitation of the compound type is obtained by calculating the vectorial sum of two currents, one being proportional to the voltage of the generator terminals, the other being proportional to the phase current, and by rectifying the resulting current. Excitation by means of electronic voltage regulation is obtained by taking the voltage from the terminals at the output of the alternator, comparing it with a reference voltage and by inputting the same into the electronic regulator which supplies the power necessary for the excitation.

Mixed excitation, on the other hand, is characterized by a compound which supplies to the machine an insufficient or an excessive excitation, and an electronic regulator, which, as a consequence acts by respectively adding or subtracting.

Compound excitation presents some advantages, such as, for example, simplicity and low-cost of the construction and the relative easiness of machine excitation, even with the low voltages generated by the residual induction, however said excitation does not insure satisfactory performance, particularly because of some functional conditions: in fact, the voltage stability is rather poor when the number of revolutions changes and even when the cos $\phi$ of the load changes; besides, it is not always easy to obtain parallel performances between alternators being thus excited.

The mixed excitation by means of compound and electronic regulation acting in subtraction presents some relevant drawbacks since, in the case of a malfunction of the electronic regulator, the voltage of the alternator increases and it is no longer possible to lower it. In the case of an electronic regulator which compensates by adding to the compound, the regulator itself must be dimensioned so that it can withstand the overloads of the machine, so that its construction becomes rather costly; besides, should a malfunction of the regulator occur, the same type of drawbacks as occur because of insufficient dimensioning of the compound excitation would present themselves.

OBJECTIONS OF THE INVENTION

The purpose of the present invention is that of overcoming many of the above-mentioned drawbacks attributed to the known electronic regulators, by creating an electronic regulator able to supply excitation voltage both in addition to and in subtraction from the alternator voltage and being done automatically so as to insure a constant voltage to the terminals of the alternator, regardless of the load conditions.

Another purpose of the invention is to provide that the regulator itself be of limited power and be easy to apply to the alternator, without substantial modification of the alternators themselves.

The above-mentioned purposes are attained by an electronic regulator, characterized by the fact that it produces circulating currents both in addition and in subtraction, according to a signal generated by a control device which is able to regulate the conduction of the regulator, both as far as polarity and amplitude are concerned, depending on the result of a comparison between a reference voltage and the voltage of the alternator itself, since said addition or subtraction are performed electrically or magnetically.

Since the regulator can supply power in both directions, it can act in the output circuits of the alternator both by adding to or subtracting from the power being generated in said circuits. The algebraic sum of the excitation power belonging to the alternator and the power produced by the electronic regulator can be obtained causing the circuits of the regulator and those of the alternator to interact both magnetically and electrically.

In the case of a magnetic connection, the alternator is provided both with its own excitation winding and with an auxiliary winding, so that the resulting fluxes add or subtract, thereby increasing or decreasing the alternator excitation flux.

In the case of an electric connection between the electronic regulator and the alternator, the algebraic sum of the powers of the regulator and of the alternator excitation occurs even before the resulting power reaches the excitation winding. As a consequence, an auxiliary winding is not necessary.

Of course, depending on whether the interaction between the electronic regulator and the alternator is of the magnetic or of the electric type, the type of construction of the alternator, and its form of excitation, it will be necessary to apply some adjustments, easily performed by an expert in this field, so that the two different systems of excitation do not influence each other according to unwanted collateral effects.

BRIEF DESCRIPTION OF THE DRAWINGS

Below is the description of a preferred form of execution of the electronic regulator of the invention, making particular reference to an alternator with a compound-type excitation, said description being given by way of example only, and thus not limiting the scope of the invention, and being illustrated in the enclosed figures, where:

FIG. 3 is an electric circuit diagram of the electronic regulator being made with the TRIAC system without the triggering device being shown;

Figure 11:
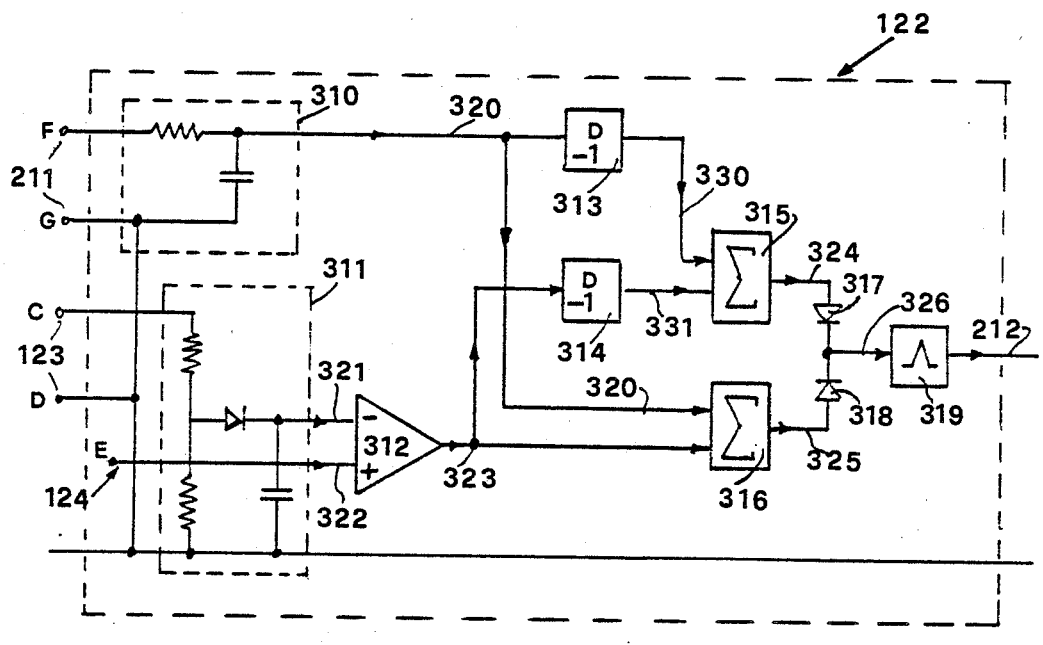
Figure 17:
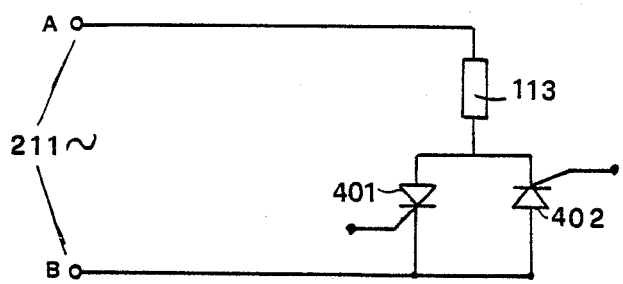
Figure 18:
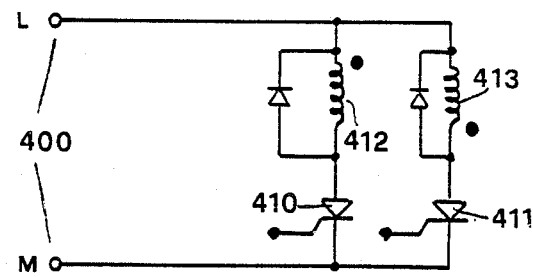
Figure 19:
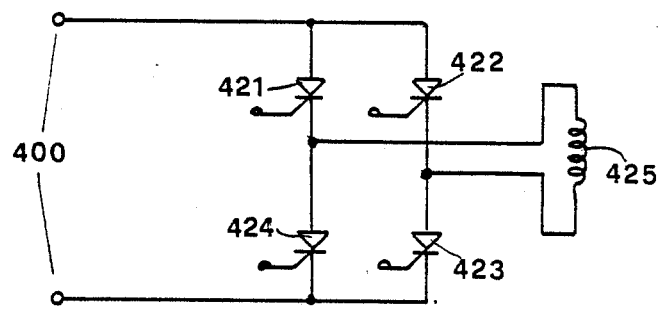

FIGS. from 4 to 10 are voltage and current diagrams referring to the circuit of FIG. 3;

FIG. 11 is an example of an embodiment, by means of a block diagram of the control electric circuit of the regulator of FIG. 3;

FIGS. 12 to 16 are voltage diagrams referring to the functioning of the control circuit of FIG. 11;

FIG. 17 is a variation of the regulator of FIG. 3, made with a pair of controlled diodes connected in inverted parallel;

FIG. 18 is another variation of the regulator of FIG. 3 made with two controlled diodes and obtaining the same effects;

FIG. 19 is yet another variation of the regulator of FIG. 3 made with 4 controlled diodes.

DESCRIPTION OF THE PREFERRED EMBODIMENTS

Figure 1:
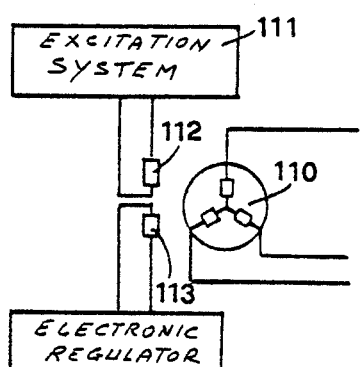
FIG. 1 is the diagram of the principle showing an alternator equipped with the electronic regulator being the object of the invention.

With reference to FIG. 1, an alternator 110 equipped with its own excitation system 111, acting through excitation windings 112, is equipped with some windings for auxiliary excitation 113, the power of which is provided by the electronic regulator 114 being the object of the invention.

Figure 2:
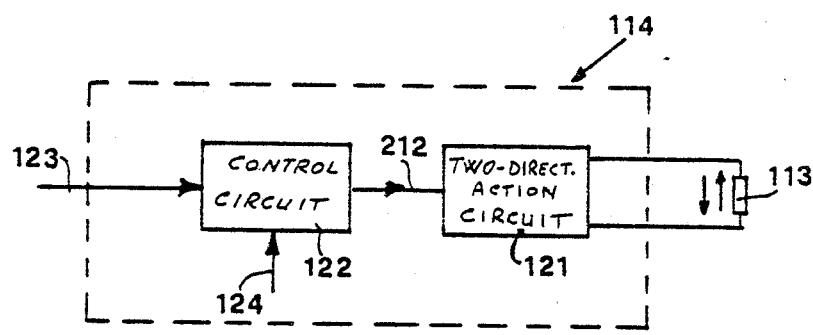
FIG. 2 is a block diagram of the electronic regulator of the invention.

The functional diagram of the device is represented in FIG. 2 and includes a device 121 able to conduct power in two directions and a corresponding control circuit 122 able to control the conduction of circuit 121, so that the power produced thereby and circulating within the auxiliary winding 113, has an amplitude and a direction being the result of a comparison between a reference voltage 124 and the voltage produced by the alternator 123.

A particularly advantageous realization of the circuit having a two-directional conduction 121 is obtained by using triac 210 as a component, as shown in FIG. 3.

This circuit is fed at terminals A and B by an auxiliary alternating voltage 211, which may be the output voltage of the alternator, a voltage generated by a separate winding of the alternator, or even a voltage supplied by an independent source. At terminal I of said circuit a series of incoming impulses 212 arrive, which are produced by a control circuit and trigger the conduction of TRIAC 210. Said impulses produce in the reactance 113, currents having opposite directions according to the instant at which they occur, in relation to the phase of the auxiliary voltage 211.

More precisely, by applying to the terminals A and B of the electronic regulating circuit 121 a sinusoidal voltage 211 with the same phase as that represented in FIG. 4, when the impulses 212 triggering the TRIAC occur at the instants marked 231 and 232 in FIG. 5, during the positive half-wave of the sinusoidal voltage 211, the voltage at the reactance terminals exhibits the waveform represented in FIG. 6 and, as a consequence, the circulating current is also positive; the same applies to the current Im, as can be seen in FIG. 7.

As is known, by advancing or delaying the triggering instants, during the positive semi-wave of 211, the average value of current Im increases or decreases accordingly.

If, on the other hand, the triggering impulses 212, also being generated by the control circuit 122, occur in the temporal instants 261 and 262 (FIG. 8), during the negative half-wave of voltage 211, then the voltage at the terminals of reactance 113 acquires a negative value having the same waveform as represented in FIG. 9, and the same happens to the current Im, which also becomes negative (FIG. 10).

Thus the main function required of the electronic regulator is achieved, i.e. that of producing an auxiliary excitation current, which, once the direction of the auxiliary winding 113 has been fixed, adds itself to or subtracts itself from the excitation of the alternator, according to the direction which said current takes, depending on the triggering instant of the TRIAC.

It is, therefore, obvious that with an appropriate control circuit, such as, for instance, the one represented in FIG. 11, which will be described later, it is possible to vary the instants 231, 232, 261 and 262, according to the specific need, thereby obtaining a broad range of positive and negative values of the average current in the reactance 113. In FIG. 11 there is represented one of the embodiments of the circuit which triggers TRIAC 210 by supplying the impulses having characteristics suited to the functioning of the regulator of the present invention. The control circuit 122 is provided with a voltage 123, being present at the output of the alternator, or, in any case, a part being proportional to said voltage. The alternating voltage 123 is converted, through a rectifying circuit with a capacitive filter indicated by 311, into a direct voltage 321 being proportional thereto and is introduced into the inverting terminal of a differential amplifier 312, where, into the non-inverting terminal 322, a reference direct voltage 124 is fed through terminal E. Thus, at the output of the differential amplifier 312, at node 323 a direct error voltage is present which varies opposite to the variations of the voltage generated by the alternator.

Figure 12:
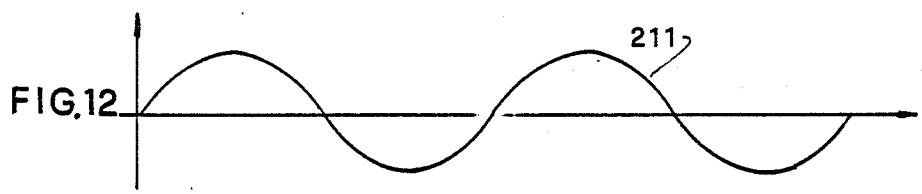
Figure 13:
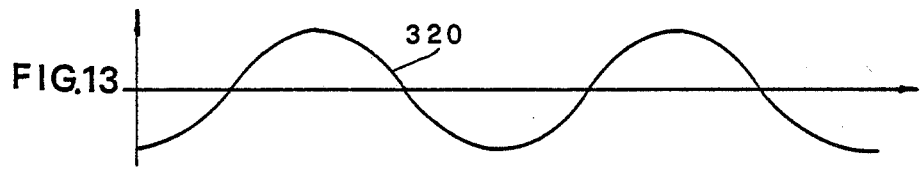
Figure 14:
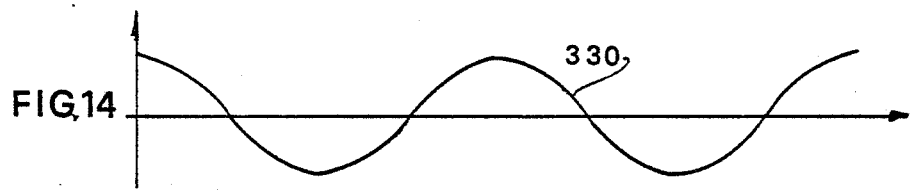
Figure 15:
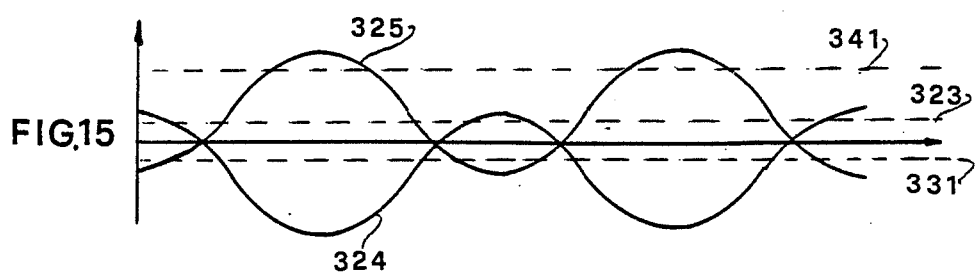

Thus, if voltage 123 increases, direct voltage 323 decreases, while, if a decrease of voltage 123 occurs, direct voltage 323 increases. The auxiliary voltage 211, to which the triggering instants of TRIAC 210 have previously been referred (see FIGS. 4 to 10), and which, for convenience of representation, has been repeated in FIG. 12, is applied to the terminals FG of circuit 122, and, through a dephasing RC circuit 310, an alternating voltage 320 is obtained, which is out of phase by approximately 90° in comparison with voltage 211, as shown in FIG. 13. In the adding circuit 316, voltage 320 is added to the direct component 323 coming out of the differential amplifier and the total signal 325, shown in FIG. 15, is obtained from this sum. The same voltage 320 is also inputted into the inverting amplifier 313 having a unitary gain, so that it comes out dephased by 180° as shown in FIG. 14, where said wave-shape is represented with reference 330. The direct signal 323 also goes into a similar inverting amplifier 314 having a unitary gain, and it comes out with a changed sign, indicated by 331 in FIG. 15. The two signals 330 and 331 then go into adder 315 and they generate the total signal 324 shown in FIG. 15.

Figure 16:
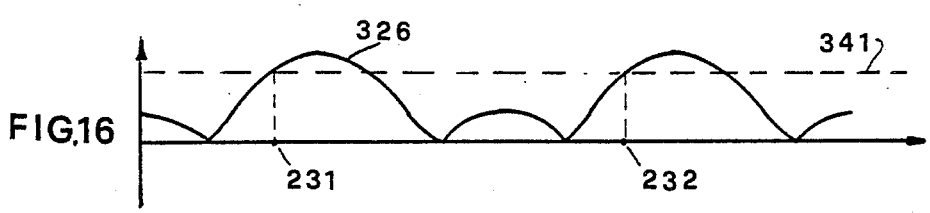

By examining FIG. 15 it can be observed that the wave shapes 324 and 325 are symmetrical in relation to the axis of the abscissa. As the alternator voltage varies and, as a consequence, signal 123 also varies, because of the foregoing effect caused by the differential amplifier 312, the signals 324 and 325 tend to mutually increase or decrease the distance therebetween, to the point of even interchanging their respective quadrants, while maintaining the symmetry in relation to the axis of the abscissa. Signal 326 given by the positive parts of the signals 324 and 325, reaches the impulse generating circuit 319, through the diodes 317 and 318, as shown in FIG. 16. The triggering impulse generator 319 produces, by means of the comparison with a pre-determined reference 341, the impulses 212 at the instants 231 and 232. In the example being produced here and with reference to FIG. 16, the impulse will occur during the positive half-wave of voltage 211 at the same instant at which wave 326 exceeds the threshold of the pre-determined reference 341.

On the other hand, when, because of the increase of signal 331 toward positive values, the maximum positive values of wave 324 also increase accordingly, wave 324 will exceed reference 341, thereby producing impulses 212 during the negative half-waves of voltage 211 at the instants indicated by 261 and 262 in FIG. 8.

To conclude, at each variation of the voltage of the alternator, a corresponding variation of voltage 123 is applied to the control circuit 122, and in turn produces a variation having the opposite sign of the direct voltage 323, which has a displacement of the sinusoidal waves 325 and 324, so that the triggering impulses 212 position themselves in such a way so as to vary the value and the sign of the current of the auxiliary excitation; from this the ensuing variation in the return of the alternator voltage is obtained. It is pointed out that, for the sake of clarity of representation, the feeding and regulating circuits of the electronic devices, have not been represented in the control circuit 122 shown in FIG. 11.

An alternative embodiment, yet having an equal effect to that of the regulating circuit illustrated in FIG. 3, is shown in FIG. 17, where TRIAC 210 is replaced by a pair of controlled diodes being connected in anti-parallel. The functioning of the system is virtually identical, but, in order to insure an appropriate triggering of the controlled diodes, some modifications of the control circuit 122 are necessary. Said modifications involve techniques known to the expert.

Yet another variation of the electronic regulator is shown in FIG. 18. The circuit reproduced here is fed by a unidirectional and pulsing voltage (400 positioned between the terminals LM in replacement of the preceding auxiliary voltage 211; Said voltage 400 can be obtained, by instance, by rectifying the voltage 211 itself. Instead of the TRIAC, two controlled diodes 410 and 411 are used in the circuit. They are connected to two separate auxiliary windings 412 and 413, being wound in opposite directions. In this case the addition or subtraction effect in relation to the excitation of the alternator is obtained by causing either one of the two controlled diodes to conduct, thereby sending current into either one of the auxiliary windings.

The impulses 212 turning on the controlled diodes will be supplied by a control circuit similar to the control circuit 122, but having virtually identical functions. Yet another variation of the electronic regulator shown in FIG. 3, is shown in FIG. 19. Only one auxiliary winding 425 is present in this circuit, but, in order to obtain current in both directions of winding 425, four controlled diodes 421, 422, 423 and 424, are necessary. Said diodes are positioned so that they will conduct in crossed pairs, such as 421 and 423 or 422 and 424.

In this case also it will be necessary to perform some modifications of the control circuit, the functions of which will remain virtually identical with those of circuit 122.

Both in the case of the circuit in FIG. 18 and in the case of the circuit in FIG. 19 the applied voltage 400 must be of the pulsing and unidirectional type in order to guarantee the turning off of the devices when the impulse stops.

In the examples in the FIGS. 17, 18 and 19 instead of the controlled diodes, other electronic power components, such as GTO, transistors or Mosfet can be advantageously used, with some modifications both in the excitation circuit and in the control circuit 122, following usual techniques.

Obviously, other variations of the constructive type concerning the regulator of the present invention can be made, depending on the type of components adopted for the realization of the circuit with two-directional action. As a consequence, the construction of the circuit controlling the impulses may also vary, without varying its function and without transcending the scope of the invention as it is described and defined in the following claims.

I claim:

1. An electronic voltage regulator for regulating the output voltage of an alternator to a desired value, comprising:
    control means for comparing said output voltage with a predetermined reference voltage and producing an impulse signal indicative of the magnitude of deviation of said output voltage above or below said reference voltage; and
    regulating means, including a single auxiliary winding, and responsive to said impulse signal for providing an auxiliary voltage on said auxiliary winding, said auxiliary voltage being superimposed on said output voltage to obtain an output voltage at said desired value.

2. The electronic voltage regulator of claim 1, wherein said control means comprises:
    means for rectifying said output voltage;
    means for providing a DC reference voltage;
    comparator means for comparing said rectified voltage with said DC reference voltage and for producing an error signal when said rectified voltage does not coincide with said DC reference voltage, said error signal having an amplitude proportional to the difference between said rectified voltage and said DC reference voltage;
    means for shifting the phase of said output voltage by 90°;
    inverter means for inverting said phase-shifted voltage and said error signal;
    adder means for adding said phase-shifted voltage and said error signal to produce a first added signal, and for adding said inverted signals to produce a second added signal; and
    impulse generating means, responsive to said added signals, for producing said impulse signal at the instant that the positive amplitude of said first or said second added signals exceeds a predetermined value.

3. The electronic voltage regulator of claim 2, wherein said regulating means comprises:
    trigger means connected to said auxiliary winding and responsive to said impulse signal, for producing said auxiliary voltage to be superimposed on said output voltage, said auxiliary voltage being added to said output voltage when said first added signal exceeds said predetermined value, and being subtracted from said output voltage when said second added signal exceeds said predetermined value.

4. The electronic voltage regulator of claim 3, wherein said trigger means comprises a TRIAC.

5. The electronic voltage regulator of claim 3, wherein said trigger means comprises two controlled diodes.

6. The electronic voltage regulator of claim 3, wherein said trigger means comprises four controlled diodes.

* * * * *